United States Patent
Verlaan et al.

(10) Patent No.: US 10,565,296 B2
(45) Date of Patent: Feb. 18, 2020

(54) DESIGNING INTERACTIVE WEB TEMPLATES

(75) Inventors: Adri Verlaan, Seattle, WA (US); John Ronald Berkeley, Kenmore, WA (US); Ethan Gur-esh, Redmond, WA (US); Oguz Mut, Redmond, WA (US); Kaare Koehler Hoevik, Sammamish, WA (US); Alexander Lee Smith, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1070 days.

(21) Appl. No.: 13/291,122

(22) Filed: Nov. 8, 2011

(65) Prior Publication Data

US 2013/0117657 A1    May 9, 2013

(51) Int. Cl.
*G06F 17/24* (2006.01)
*G06F 17/21* (2006.01)

(52) U.S. Cl.
CPC ............ *G06F 17/24* (2013.01); *G06F 17/212* (2013.01)

(58) Field of Classification Search
CPC .... G06F 17/2247; G06F 17/24; G06F 17/211; G06F 17/2725
USPC ........................................ 715/234, 235, 237
See application file for complete search history.

(56) References Cited

U.S. PATENT DOCUMENTS

| | | | |
|---|---|---|---|
| 6,112,242 A | 8/2000 | Jois et al. | |
| 7,240,077 B1 | 7/2007 | Edelman et al. | |
| 7,316,003 B1 * | 1/2008 | Dulepet et al. | 717/111 |
| 7,555,706 B2 | 6/2009 | Chapman et al. | |
| 8,015,487 B2 * | 9/2011 | Roy et al. | 715/255 |
| 2004/0143822 A1 | 7/2004 | Jager et al. | |
| 2004/0268231 A1 | 12/2004 | Tunning | |
| 2007/0288890 A1 | 12/2007 | Wells | |
| 2008/0140766 A1 | 6/2008 | Mohan | |
| 2008/0172608 A1 | 7/2008 | Patrawala et al. | |

(Continued)

OTHER PUBLICATIONS

Apache Lanye Documentation—Open Source Content Management & CMS Menus How-to, Aug. 9, 2011, The Apache Software Foundation, p. 1, 3.*

(Continued)

*Primary Examiner* — Scott T Baderman
*Assistant Examiner* — Seung Woon Jung
(74) *Attorney, Agent, or Firm* — Holzer Patel Drennan

(57) ABSTRACT

A web template author can author interactive web templates via a static markup language-based authoring tool. The web template author can insert static markup language snippets representing one or more configurable controls of a web template into a static markup language-based authoring tool. Each snippet includes a definition of a preview of a configurable control in a static markup language as well as one or more disabled CMS instructions for the configurable control. The web template author can configure and view previews of the inserted configurable controls as they are added to the web template being developed within the static markup language-based authoring tool. When the web template author is satisfied with a version of a web template, the web template author can upload the static markup language definition of the web template to the server, where the web template is converted into a CMS-compatible web template.

10 Claims, 6 Drawing Sheets

(56) References Cited

U.S. PATENT DOCUMENTS

2009/0019386 A1    1/2009    Sweetland et al.
2011/0029879 A1    2/2011    Calvin

OTHER PUBLICATIONS

Altova XMLSpy Professional Edition User Manual, 2006, Altova GmbH, p. 8, 16, 18, 59, 109, 319, 406, 530, 531.*
McFarland, David Sawyer., "Templates—Dreamweaver CS5: The Missing Manual", Retrieved at <<http://oreilly.com/web-development/excerpts/0636920001393/templates-ch19.html>>, Retrieved Date: Sep. 1, 2011, pp. 32.
"Web Content Management Systems", Retrieved at <<http://quinn.com/web-content-management-systems>>, Retrieved Date: Sep. 1, 2011, pp. 2.
"Creating a Site-Wide Layout Using Master Pages", Retrieved at <<http://www.asp.net/master-pages/tutorials/creating-a-site-wide-layout-using-master-pages-cs>>, Retrieved Date: Sep. 1, 2011, pp. 20.
"Parallels Plesk Sitebuilder", Retrieved at <<http://download1.parallels.com/Sitebuilder/Windows/docs/4.5/en_US/sitebuilder-4.5-templates-guide.pdf>>, Retrieved Date: Aug. 30, 2011, pp. 92.
"VWD-CMS Version 1.0", Retrieved at <<http://www.vwd-cms.com/Documentation/v010/asp-net-master-pages.aspx>>, Retrieved Date: Sep. 1, 2011, pp. 4.
Apache Lenya Documentation—Open Source Content Management & CMS Menus How-to, Aug. 9, 2011, The Apache Software Foundation, pp. 1, 3.
Altova XMLSpy Professional Edition User Manual, 2006, Altova GmbH, pp. 8, 16, 18, 59, 109, 319, 406, 530, 531.
Tizag.com, "HTML Tutorial-Comments", version online as of May 28, 2010, 2 pages; https://web.archive.org/web/20100528154129/http://www.tizag.com/htmlT/htmlcomments.php.

* cited by examiner

DESIGNING INTERACTIVE WEB TEMPLATES

CROSS-REFERENCE TO RELATED APPLICATIONS

The subject matter of the present application is related to subject matter of U.S. Nonprovisional patent application Ser. No. 13/291,119, entitled "Conversion of Web Template Designs" and filed concurrently herewith, which is incorporated by reference herein for all that it discloses and teaches.

BACKGROUND

A content management system (CMS) provides a framework for website authoring, collaboration, and administration. A user with little or no programming or webpage design knowledge can enter his or her own content, such as press releases, images, articles, new personnel biographies, etc., into a website design provided by a knowledgeable website designer and/or programmer. In this paradigm, the user can purchase a professionally developed website and then populate it with his or her own new content without requiring the services of the website vendor to update the website with the new content. Instead, the website is equipped with a CMS through which the user can enter his or her content so that the content is rendered within the consistent design of the originally developed website.

For example, a business' website may be professionally designed using templates to provide a consistent theme, including without limitation, the color, size, placement and styles of titles, controls, text, etc. Typically, such themes are propagated throughout the website within some limited variation to maintain a sense of unity within the website. However, the content of such websites can change as the communication needs of the business change. An example is the addition of a press release on a new product—the business will typically want to post the press release on its website. The user can input the press release content into a website via a CMS, which combines the new content with master page templates and/or page layout templates to create a new consistently designed webpage containing the new content for the website.

In some environments, a CMS is based on a static markup language, such as HTML. The content and web templates are combined offline and stored as static HTML until a user accesses the new webpage (e.g., using a URL referencing the new webpage), at which point a web server retrieves the static webpage and presents it to the requesting user (e.g., through the user's browser). In other environments, a CMS is based on dynamic rendering of each webpage upon request (e.g., the HTML defining the requested webpage is dynamically rendered in response to the user's request). The latter approach can provide more sophisticated and adaptive features within the website.

However, while developers and web authoring environments for static HTML CMSs are numerous, there are fewer developers and web authoring environment choices for dynamic rendering within content management systems. It is a considerable challenge to provide a static HTML developer using a static HTML authoring tool with options for providing dynamically rendered web templates for use in a CMS.

SUMMARY

Implementations described and claimed herein address the foregoing problems by providing a solution that allows a web template author to author interactive web templates via a static markup language-based authoring tool. The web template author can insert static markup language snippets representing one or more configurable controls of a web template into a static markup language-based authoring tool. Each snippet includes a definition of a preview of a configurable control in a static markup language as well as one or more disabled CMS instructions for the configurable control. The web template author can configure and view previews of the inserted configurable controls as they are added to the web template being developed within the static markup language-based authoring tool. When the web template author is satisfied with a version of a web template, the web template author can upload the static markup language definition of the web template to the server, where the web template is converted into a CMS-compatible web template.

In some implementations, articles of manufacture are provided as computer program products. One implementation of a computer program product provides one or more tangible computer program storage media readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
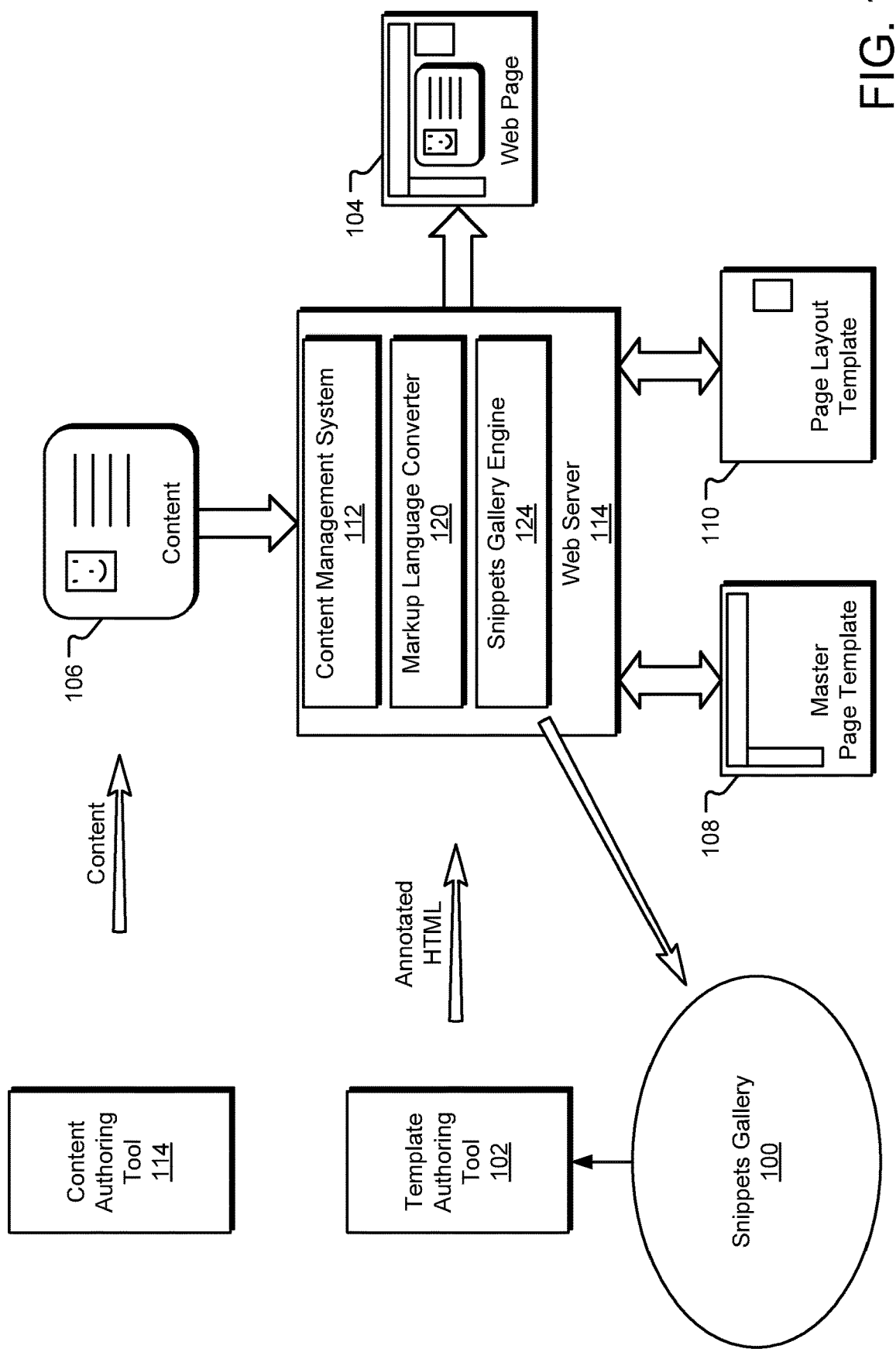
FIG. 1 illustrates example data sources and flows for building interactive websites using a snippets gallery.

FIG. 1 illustrates example data sources and flows for building interactive websites using a snippets gallery 100. In a common scenario, a web template author employs a template authoring tool 102 to develop web templates for a particular website, such as a website including a webpage 104. Through the template authoring tool 102, the web template author can defining graphical features of a webpage, and more particularly, graphical features of one or more web templates that can be combined with user-provided content 106 to be rendered as the webpage 104.

Two example web templates shown in FIG. 1 include a master page template 108 and a page layout template 110 (examples of web templates), which are typically stored in a web templates datastore (not shown). In one implementation, a web templates datastore includes various master page templates, various page layout templates, etc., which are used to render webpages for a website. For example, the master page template 108 provides the generalized regions, such as the headers and footers, shared by all or a particular set of webpages on the website. It should be understood that a website may be associated with multiple master page templates, for example, depending on the presentation device being used access website (e.g., computer, tablet, smartphone). The web template datastore may also include one or more page layout templates 110 configured for displaying the content on a presentation device within particular webpages of a website.

In one implementation, the master page template 108 defines graphical features common to all webpages on a website while the page layout template 110 defined graphical features, including content placement, for individual webpages on the website. When a user navigates to a webpage on the website (e.g., providing a URL to the webpage through a browser), a content management system (CMS) 112 executing on a web server 114 retrieves a master page template 108 and a page layout template 110 associated with the specified webpage, retrieves the content 106 associated with the specified webpage, and combines them for presentation to the user as the webpage 104. In this manner, a web template author can develop a professional-looking website, via the template authoring tool 102 and based on the web templates providing consistent graphical features, color palette, and programmatic features without specifying or maintaining currency of the specific content 106. Likewise, a non-technical user, such as a marketing consultant, can provide and maintain the content 106 via a content authoring tool 116 for presentation on the webpage 104, without being required to develop the graphical features, color pallet, and programmatic features of the webpage 104.

However, certain development environments are limited in their support of CMS instructions and other dynamic elements. For example, the template authoring tool 102 supports static markup language instructions but does not natively support CMS instructions. Without such support, the web template author is unable to develop web templates including the CMS instructions for the CMS 112. Accordingly, the described technology provides the snippets gallery 100 that includes configurable controls for use by a template authoring tool 102, wherein each configurable control is instrumented with a static markup language preview of the configurable control and a disabled CMS instruction for the configurable control. In this manner, the web template author can incorporate configurable controls from the snippets gallery 118 into the template authoring tool 102 in a format supported by the template authoring tool 102. Further, the web template author can observe a working preview of a particular web template that incorporates a static markup language preview of the configurable control from the snippets gallery 118 and can upload the web template from the template authoring tool 102 (e.g., in the format of annotated static markup language, such as annotated HTML—the annotations including the enabled preview and the disabled CMS instruction) for use in the CMS 112, including with one or more CMS instructions specifying configurable controls understood by the CMS 112.

A markup language converter 120 converts the annotated static markup language output from the template authoring tool 102 into CMS-compatible web templates, such as the master template 108 and the page layout template 110, by stripping out or disabling the static markup language previews and enabling the CMS instructions for each web template. The web templates are then stored in the web templates datastore for retrieval when a corresponding webpage to be rendered. In this manner, the web template author is able to work in the static markup language with which he or she is comfortable and/or that are supported by the template authoring tool 102 while gaining access to the rich functionality offered by the configurable controls defined in the snippets gallery 118 and supported by the CMS.

A snippets gallery engine 124 presents the snippets gallery to a web template author, such as through a browser or a local or remote application. In one implementation, the snippets gallery engine 124 accesses a datastore of configurable controls and their associated snippets and presents the snippets in a snippets gallery for use by the web template author.

Figure 2:
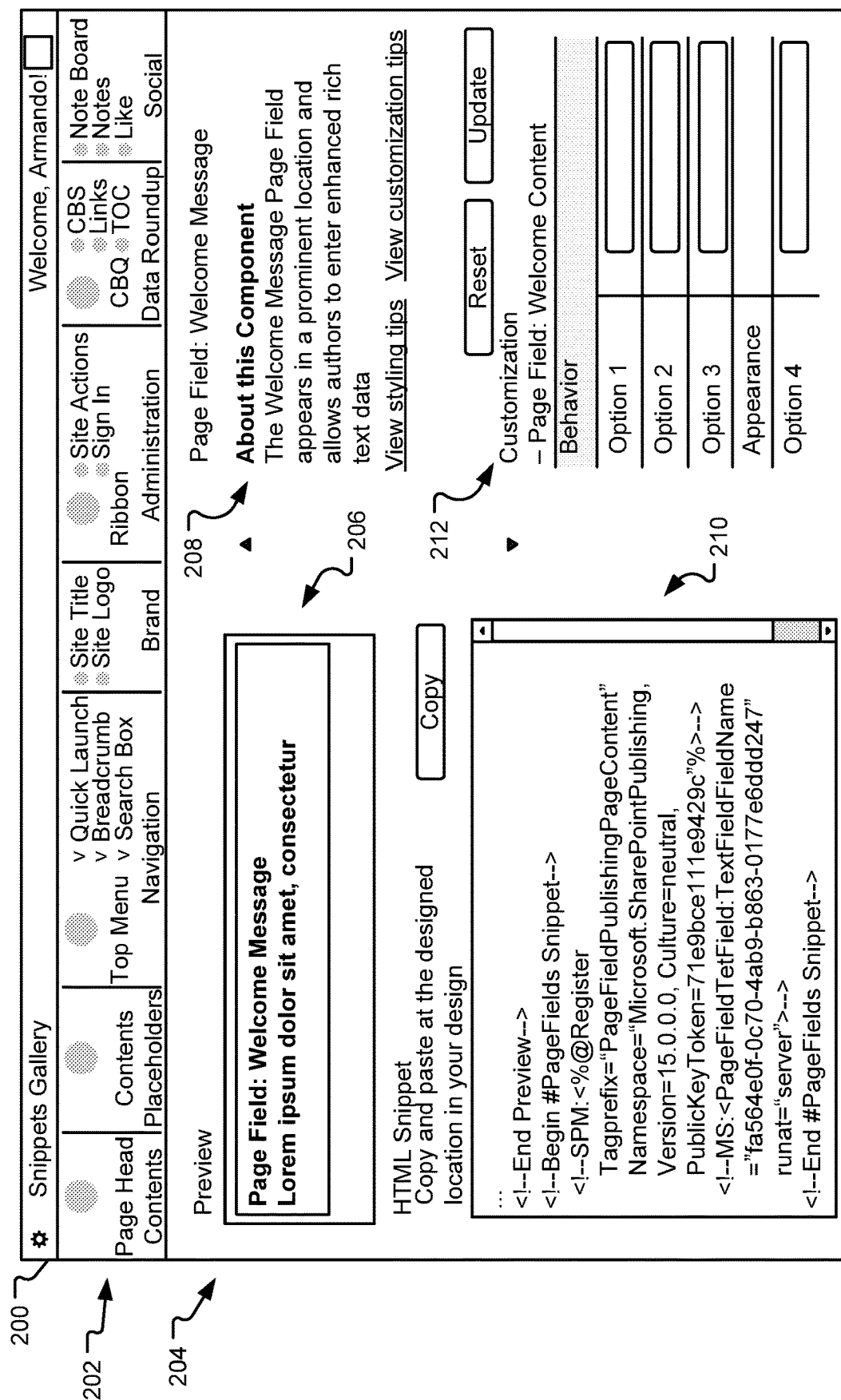
FIG. 2 illustrates an example snippets gallery screenshot.

FIG. 2 illustrates an example snippets gallery screenshot 200. In one implementation, the snippets gallery is provided as a browser-accessible service served by a web server, although a stand-alone application, whether local or remote, may alternatively be employed. In the implementation illustrated in FIG. 2, a ribbon 202 of configurable controls is displayed along the top of the snippets gallery. An author can select from various configurable controls, which causes a configuration page 204 for the selected control to be displayed below the ribbon 202. The configuration page 204 presents four page sections: a Preview section 206, an Information section 208, a Snippet section 210, and a Customization section 212.

The Preview section 206 displays an approximate preview of the configurable control as it would be displayed in a webpage that is built on a web template that includes the configurable control. However, in one implementation, the Preview section 206 does not incorporate formats specified by a style sheet within the authoring environment. In the example of FIG. 2, the configurable control is a Page Field for a Welcome Message. In the screenshot 200, the configurable control has not yet been customized so it contains default text, including some placeholder text, with a default appearance. When actually inserted into a web template authoring tool or a webpage, the rendered Page Field will be stylized by virtue of customization properties entered into the Customization section 212 and by any style sheet designated for the webpage by the web template author. In addition to providing a preview in the Preview section 206, the snippets gallery also provides an Information section 208 that presents some descriptive text about the configurable control, along with links to more information about the configurable control and its use.

The Customization section 212 includes a property grid for configuring properties of a selected configurable control. In this manner, the author can provide some customization to the configurable control through the snippets gallery interface. A reset button 214, when selected, resets the property grid to its default state. An update button 216, when selected, pushes the entered properties to the preview to render the configurable control in its customized state.

The Snippet section 210 presents the static markup code for the configurable control that is selected from the ribbon 202. The snippet presented in the Snippet section 210 includes one or more enabled static markup language instructions for a static markup language preview of the configurable control and one or more disabled CMS instructions for the configurable control. In one implementation, the one or more CMS instructions are disabled using a commenting feature of the static markup language, although other disabling options may be employed (e.g., a disabling property, tag, or flag that indicates to a template authoring tool that the one or more CMS instructions are disabled). When disabled, the one or more CMS instructions are operatively hidden from the static markup language-based template authoring tool or otherwise suppressed within the static markup language-based template authoring tool in some way. As such, the static markup language-based template authoring tool processes the static markup language instruction for the configurable control preview, presenting it to the user in a preview mode of the template static markup language-based template authoring tool.

It should be understood that, if the static markup language-based template authoring tool applies formatting, such as formatting specified in a style sheet or other data source, to controls displayed in its preview pane, then the preview of the configurable control may also be formatted in the same way. This feature allows the web template author to view the configurable control preview as it would be viewed on a webpage.

An example snippet is shown below and includes an HTML instruction at line 3 representing the static markup language preview and an ASP.net instruction at line 5 representing a CMS instruction of the configurable control. The ASP.net instruction is enclosed in a comment structure and is therefore disabled, while the HTML instruction is enabled for processing by a static markup language-based template authoring tool.

```
1   <!--Begin #PageFields Snippet-->
2       <!--Begin Preview -->
3           <span>Title</span>
4       <!--End Preview-->
5       <!--ASP: SPM:<%@Register Tagprefix=
            "PageFieldPublishingPageContent" Namespace=
            "Microsoft.SharePointPublishing, Version=15.0.0.0,
            Culture=neutral, PublicKeyToken=
            71e9bce111e9429c"%>-->
6       <!--MS:<PageFieldTetField:TextFieldFieldName="fa564e0f-
            0c70-4ab9-b863-0177e6ddd247" runat="server">-->
7   <!--End #PageFields Snippet-->
```

When using a snippet from the snippets gallery, an author can select a configurable control from the ribbon 202, obtain information about the configurable control in the Information section 208 including associated styling and customization tips, configure the configurable control in the Customization section 212, and preview the configured control in the Preview section 206. When the author is ready to incorporate the configurable control into his or her web template through the static markup language-based template authoring tool, the author can copy the static markup language from the Snippet section 210 and paste it into the coding section of the template authoring tool. The pasted snippet includes an enabled preview and a disabled CMS instruction for the selected configurable control.

The author can repeat this process for other configurable controls pasted into the web template until he or she is satisfied with the web template. When the author uploads the static markup language web template to the web server, a conversion engine disables (e.g., comments out, deletes, etc.) the static markup language representing each preview and enables (e.g., removes the comment structure) the CMS instructions for each configurable control, yielding a CMS-compatible web template, which can be stored in a web server accessible datastore. When a user navigates to a webpage associated with one or more of the web templates, the CMS combines the associated web templates with associated content to render the webpage.

Figure 3:
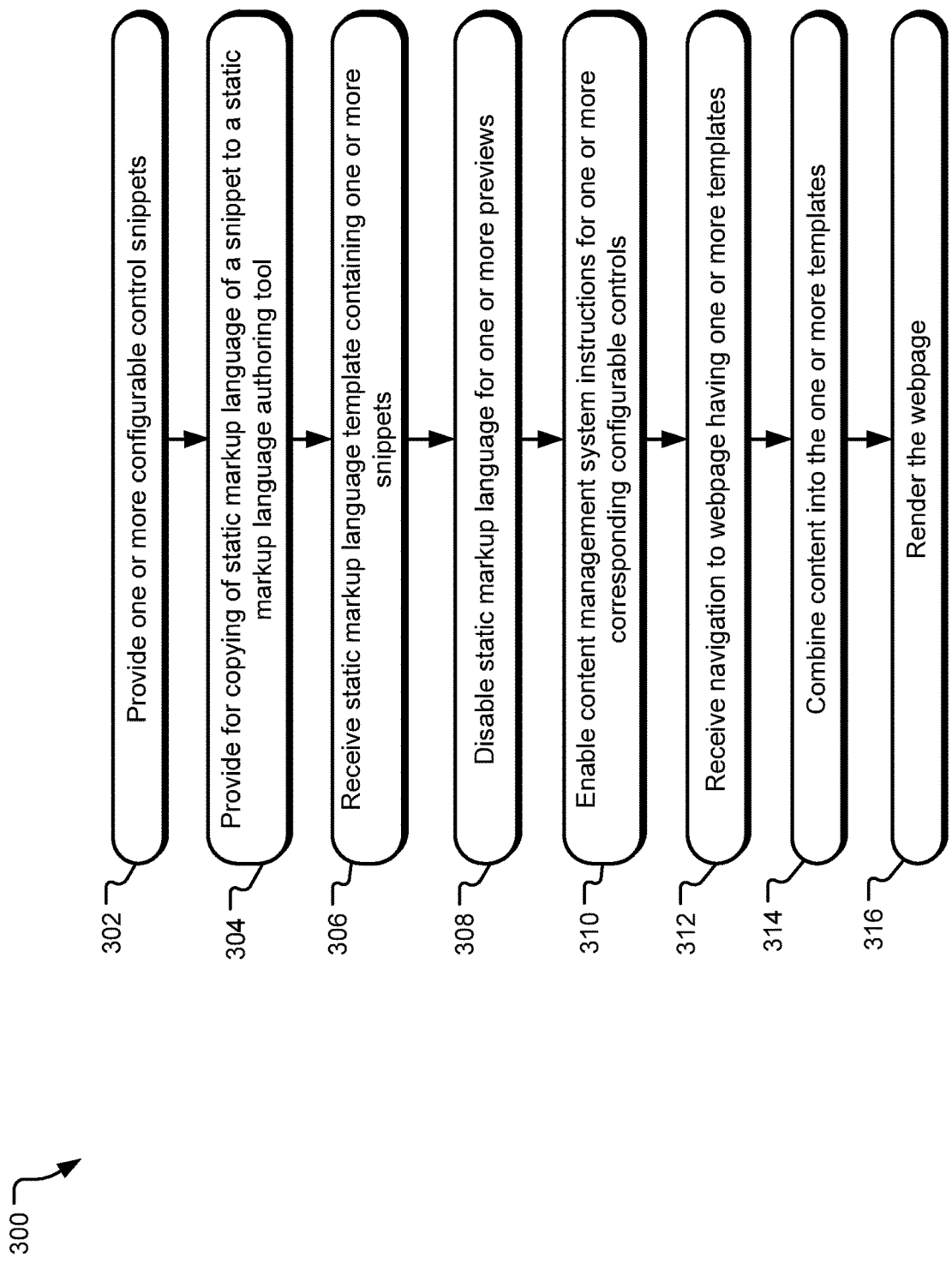
FIG. 3 illustrates example operations for building an interactive website using a snippets gallery.

FIG. 3 illustrates example operations 300 for a building interactive websites using a snippets gallery. A providing operation 302 provides one or more configurable control snippets, such as in a snippets gallery, for use by a web template author. Each snippet includes a static markup language preview of the configurable control and a CMS instruction for the configurable control. In one implementation, the static markup language preview is enabled and the CMS instruction is disabled within the snippets gallery, although in other implementations the enabling and disabling can be performed programmatically, such as during a copy and/or paste stage.

Another providing operation 304 provides a facility for copying the static markup language of a snippet associated with the configurable control. Once copied, the snippet can be pasted into the coding section of a static markup language-based template authoring tool for inclusion in a web template.

At some point, the developer is satisfied with the web template including one or more configurable controls that are represented by snippets and uploads the static markup language web template to a web server, which receives the web template in a receiving operation 306. A disabling operation 308 disables static markup language preview instructions, such as by deleting the preview instructions, commenting out the preview instructions, etc. An enabling operation 310 enables CMS instructions for the configurable controls that correspond to the disabled preview instructions (such as by removing a comment structure associated with the CMS instructions, modifying a property or tag associated with CMS instructions, etc.), leaving a web template that is compatible with the CMS used at a web server. Other CMS-compatible web templates may be generated in a similar fashion.

A receiving operation 312 receives a navigation instruction at a web server, directing navigation to a webpage that includes one or more CMS-compatible web templates. A combining operation 314 combines content, which is provided through the CMS, with the CMS-compatible web template. A rendering operation 316 renders the combined content and one or more web templates as a webpage.

Figure 4:
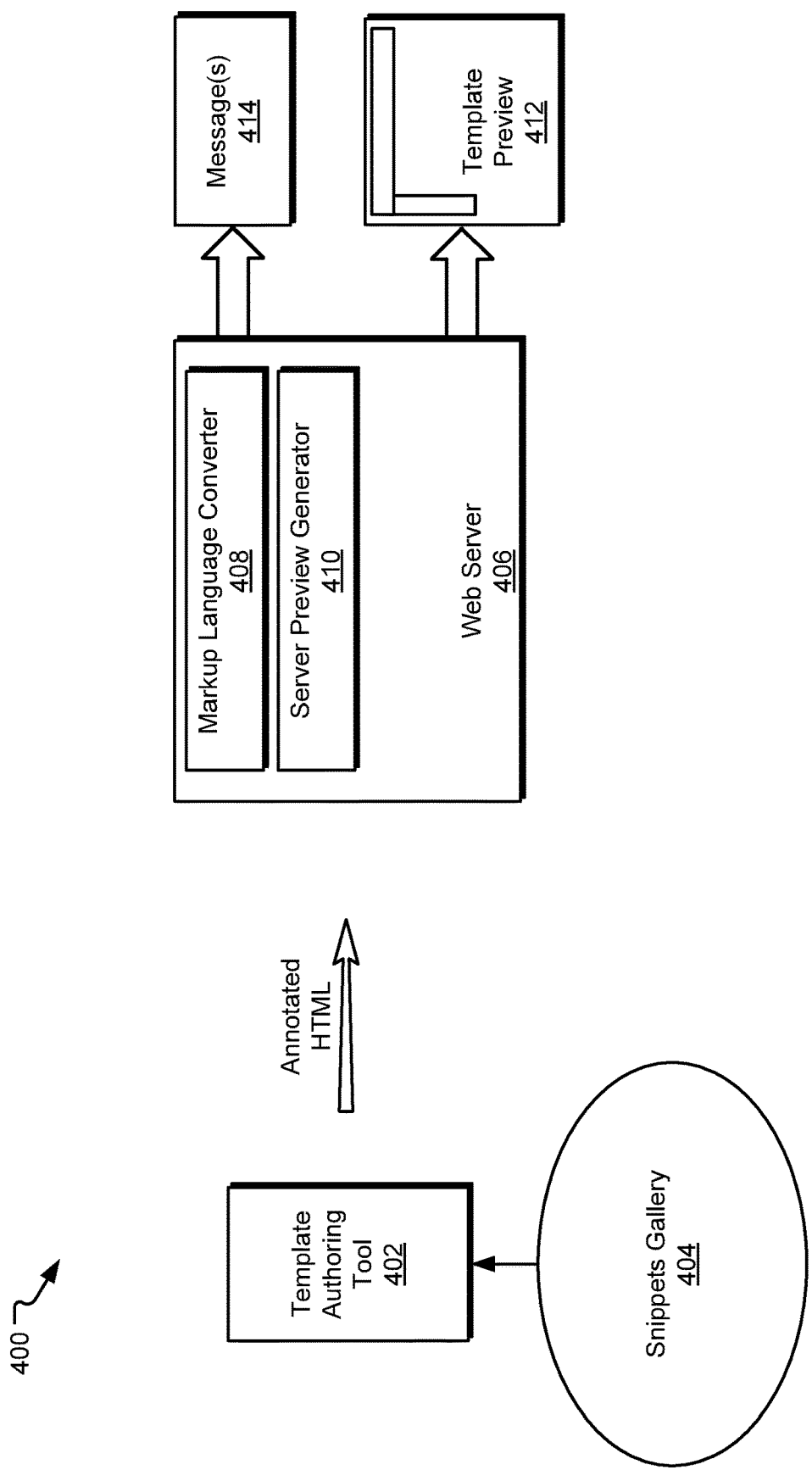
FIG. 4 illustrates an example system for providing a server preview of one or more interactive web templates.

FIG. 4 illustrates an example system 400 for providing a server preview of one or more interactive web templates. While a web template author authors a web template within a template authoring tool 402 using a snippets gallery 404, the author may wish to preview the web template to observe the way the web template will be rendered by a web server 406 during normal operation. Accordingly, the web template author can upload the annotated HTML (e.g., the static markup language including one or more snippets) to the web server 406, where a markup language converter 408 disables the static markup language preview instructions and the enables CMS instructions for each configurable control. The resulting CMS-compatible web template is passed to a server preview generator 410, which renders a preview 412 of the web template and/or generates one or more messages 414 associated with the rendering of the web template preview 412. In an alternative implementation, sample content data or even some form of live content data may be included in the rendering of the web template preview 412. Example messages may include without limitations error messages identifying errors in the web template's instructions, guidance to other configurable controls the web template author may want to include in the web template, etc.

Figure 5:
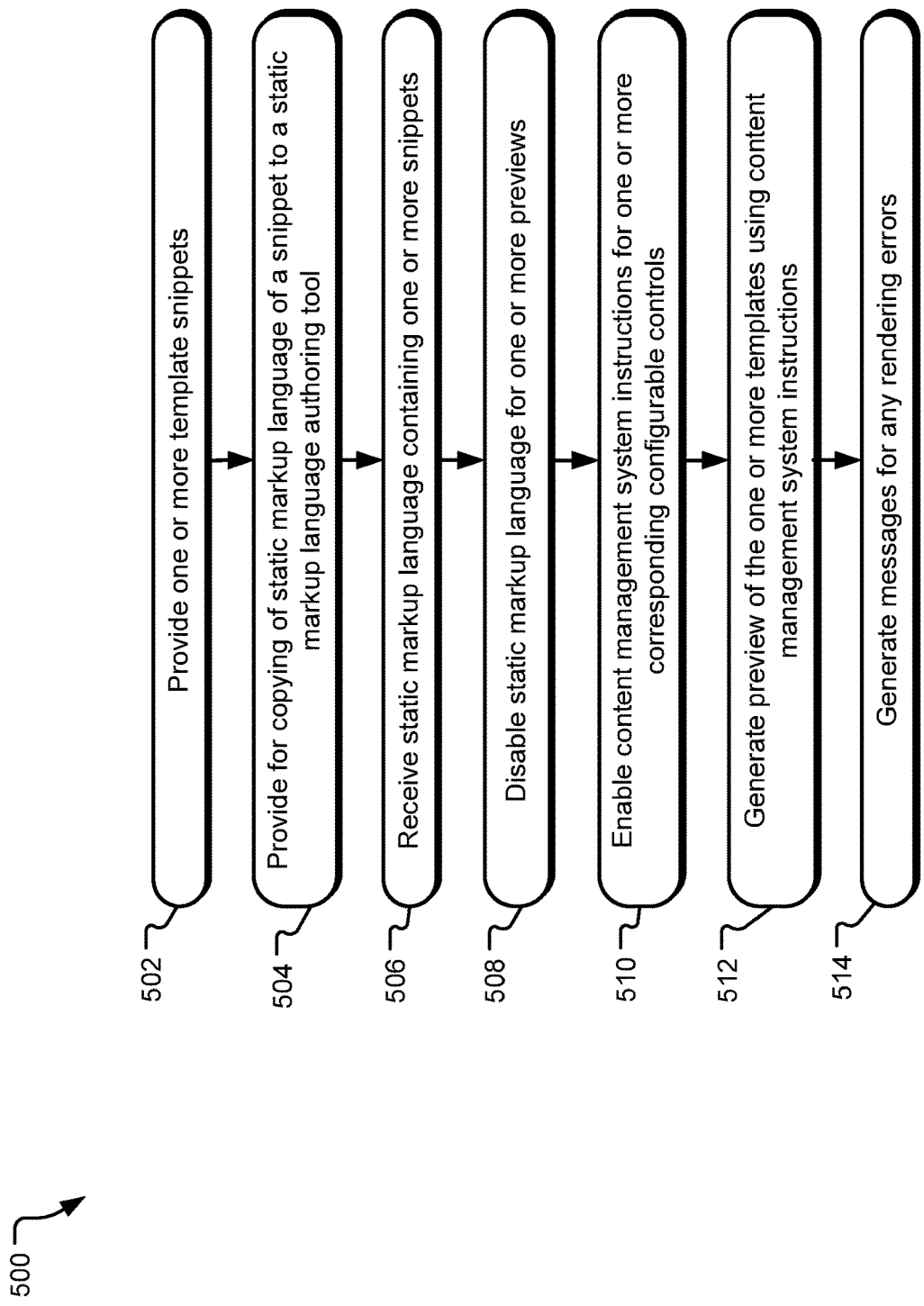
FIG. 5 illustrates example operations for providing a server preview of one or more interactive web templates.

FIG. 5 illustrates example operations 500 for providing a server preview of one or more interactive web templates. A providing operation 502 provides one or more configurable control snippets, such as in a snippets gallery, for use by a web template author. Each snippet includes a static markup language preview of the configurable control and a CMS instruction for the configurable control. In one implementation, the static markup language preview is enabled and the CMS instruction is disabled within the snippets gallery, although, in other implementations, the enabling and disabling can be performed programmatically, such as during a copy and/or paste stage.

Another providing operation 504 provides a facility for copying the static markup language of a snippet associated with the configurable control. Once copied, the snippet can be copied into the coding section of a static markup language-based authoring tool for inclusion in a web template.

At some point, the web template author can view a preview of the web template as it would appear in a browser, including one or more configurable controls that are represented by snippets. To view a preview in a browser, the web template author uploads the static markup language web template to a web server, which receives the web template in a receiving operation 506. A disabling operation 508 disables static markup language preview instructions, such as by deleting the preview instructions, commenting out the preview instructions, etc. An enabling operation 510 enables CMS instructions for the configurable controls that correspond to the disabled preview instructions (such as by removing a comment structure associated with the CMS instructions, modifying a property or tag associated with CMS instructions, etc.), leaving a web template that is compatible with the CMS used at a web server. A generating operation 512 renders a preview of the web template based on the enabled CMS instructions in the web template. Furthermore, one or more messages may be generated in a generating operation 514 to present the web template author with errors, warnings, guidance, etc. pertaining to the rendering of the preview by the web server.

Figure 6:
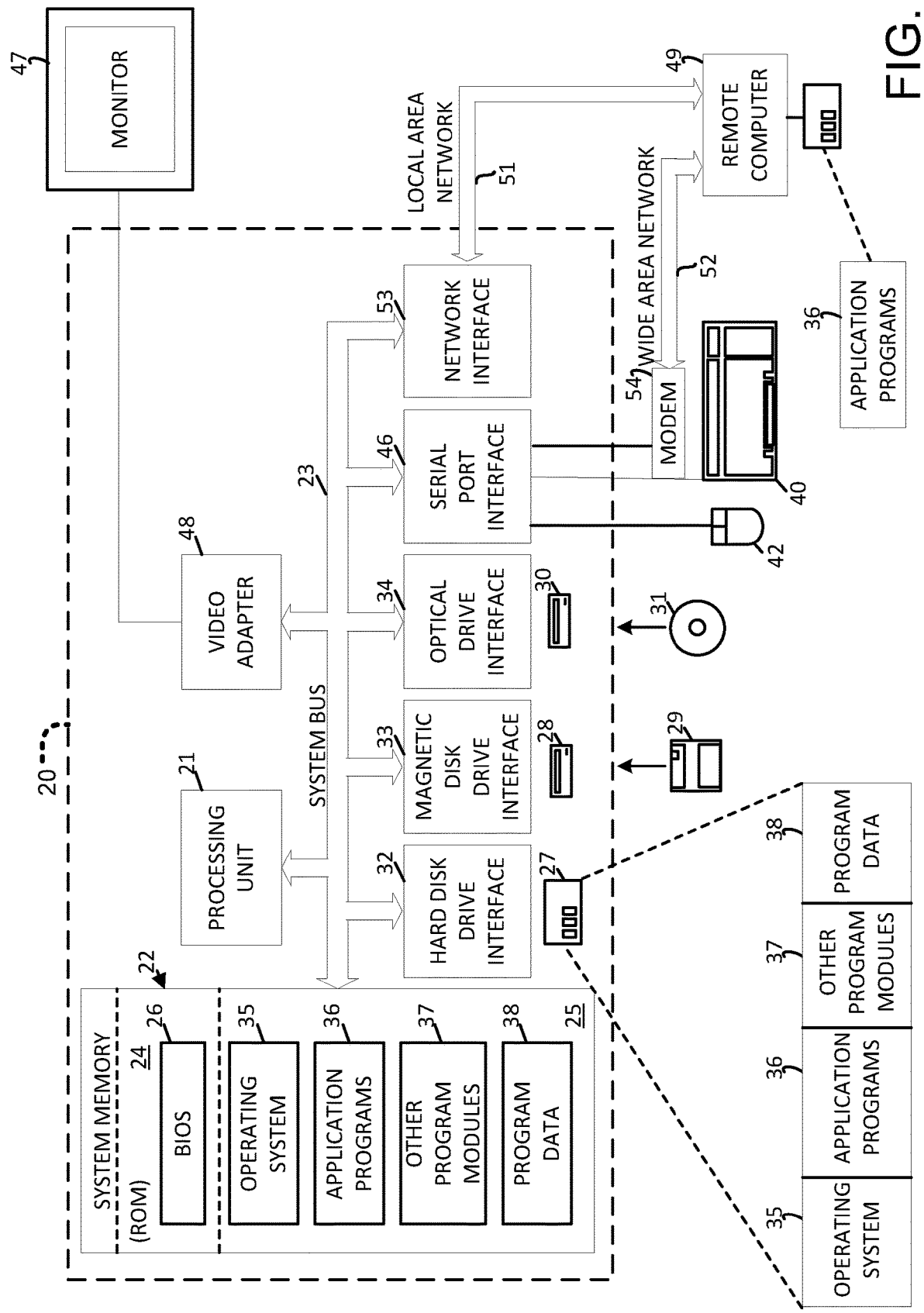
FIG. 6 illustrates an example system that may be useful in implementing the described technology.

FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, a content management system, a markup language converter, a snippets gallery engine, a server preview generator, and other modules and software systems may be embodied by instructions stored in memory 22 and/or storage devices 29 or 31 and processed by the processing unit 21. The snippets gallery, a master template, a page layout template, a webpage, messages, and other data may be stored in memory 22 and/or storage devices 29 or 31 as persistent datastores. Further, such modules and software systems may represent hardware and/or software configured to provide service functionality for network-connected systems. Such services may be implemented using a general purpose computer and specialized software (such as a server executing service software), a special purpose computing system and specialized software (such as a mobile device or network appliance executing service software), or other computing configurations.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
receiving a static markup language web template, the static markup language web template including one or more static markup language instructions defining a preview of a configurable control displayable within a static markup language authoring system and one or more content management system instructions defining the configurable control, the one or more content management system instructions being disabled within the static markup language web template;
disabling the one or more static markup language instructions defining the preview of the configurable control;
enabling the one or more content management system instructions defining the configurable control; and
rendering at a web server the static markup language web template using the one or more enabled content management system instructions for the configurable control.

2. The method of claim 1 wherein the web template is rendered as part of a webpage in combination with content via a content management system.

3. The method of claim 1 wherein the web template is rendered as a preview in a browser.

4. The method of claim 1 wherein the rendering operation comprises:
presenting one or more messages pertaining to the rendering of the web template as a preview.

5. The method of claim 1 further comprising:
presenting a gallery of configurable controls, the gallery including a section presenting copyable static markup language instructions including the one or more instructions defining the preview of the configurable control and the one or more disabled content management system instructions defining the configurable control.

6. The method of claim 1 further comprising:
presenting a gallery of configurable controls, the gallery including a section through which the configurable control is customized by one or more editable properties and a section through which the customized configurable control is previewed.

7. The method of claim 1 further comprising:
presenting a gallery of configurable controls, the gallery including a customization section through which the configurable control is customized by one or more editable properties, a snippet section presenting copyable instructions including the one or more static markup language instructions defining the preview of the configurable control and the one or more disabled content management system instructions defining the configurable control, and a preview section displaying the preview of the configurable control as defined by the static markup language instructions, the copyable instructions including customization defined by the editable properties in the customization section; and
incorporating, into the static markup language web template, at least the copyable instructions including the one or more static markup language instructions defining the preview of the configurable control and the one or more disabled content management instructions defining the configurable control.

8. The method of claim 1 wherein the disabling operation comprises:

deleting the one or more static markup language instructions defining the preview of the configurable control.

9. The method of claim 1 wherein the enabling operation comprises:
removing one or more comment structures used to disable the one or more content management system instructions.

10. A physical hardware system comprising:
a markup language converter hardware subsystem configured to access a web template including one or more content management system instructions defining a configurable control and one or more static markup language instructions defining a preview of the configurable control, the one or more content management system instructions being disabled within the web template, the markup language converter being further configured to enable the one or more content management system instructions defining the configurable control by modifying a property or tag and to disable the one or more static markup language instructions defining the preview of the configurable control; and
a web server configured to render the web template using the one or more enabled content management system instructions for the configurable control, the content management system instructions functioning to combine content with the web template to create a webpage.

* * * * *